United States Patent
Chen

(10) Patent No.: US 12,387,887 B2
(45) Date of Patent: Aug. 12, 2025

(54) CONTROL SYSTEM

(71) Applicant: PRIMAX ELECTRONICS LTD., Taipei (TW)

(72) Inventor: Chi-Shiu Chen, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 573 days.

(21) Appl. No.: 18/048,051

(22) Filed: Oct. 20, 2022

(65) Prior Publication Data
US 2023/0215669 A1  Jul. 6, 2023

Related U.S. Application Data

(60) Provisional application No. 63/296,273, filed on Jan. 4, 2022.

(51) Int. Cl.
| | | |
|---|---|---|
| *H01H 13/83* | (2006.01) | |
| *H01H 13/70* | (2006.01) | |
| *H01H 13/705* | (2006.01) | |
| *H01H 13/85* | (2006.01) | |

(52) U.S. Cl.
CPC .......... *H01H 13/83* (2013.01); *H01H 13/705* (2013.01); *H01H 13/85* (2013.01)

(58) Field of Classification Search
CPC ...... H01H 13/83; H01H 13/705; H01H 13/85; H01H 13/14; G06F 3/016; G06F 3/0219; G06F 3/0482
See application file for complete search history.

(56) References Cited

U.S. PATENT DOCUMENTS

| | | | | |
|---|---|---|---|---|
| 2011/0093817 A1* | 4/2011 | Song | ...................... | H04N 21/47 345/168 |
| 2015/0058766 A1* | 2/2015 | Wang | .................. | G06F 3/04817 715/765 |
| 2016/0191800 A1* | 6/2016 | Yoshikawa | .......... | H04N 23/632 348/220.1 |
| 2021/0037189 A1* | 2/2021 | Maejima | ............... | H04N 23/631 |
| 2024/0004515 A1* | 1/2024 | Wang | .................. | G06F 3/04817 |

* cited by examiner

*Primary Examiner* — Pegeman Karimi
(74) *Attorney, Agent, or Firm* — WPAT, PC

(57) ABSTRACT

A control system includes a control device and a display device. The control device includes plural keys in a specified arrangement. The plural keys are marked with plural first-layer options. Each first-layer option extends plural second-layer options. The display device is in communication with the control device. A display image of the display device includes plural display blocks. An arrangement of the plural display blocks is identical to the arrangement of the plural keys. When one of the plural keys is triggered by a user, the second-layer options extended from the first-layer option corresponding to the triggered key are shown on the display image, and the second-layer options are included in the corresponding display blocks, respectively. A specified option of the second-layer options is selected by the user when the key on the control device and at a position corresponding to the specified option is triggered.

13 Claims, 4 Drawing Sheets

CONTROL SYSTEM

CROSS-REFERENCE TO RELATED APPLICATION

This application claims priority to U.S. Provisional Patent Application No. 63/296,273 filed Jan. 4, 2022, the contents of which are incorporated herein by reference.

FIELD OF THE INVENTION

The present invention relates to a control system, and more particularly to a control system comprising a control device and a display device.

BACKGROUND OF THE INVENTION

Nowadays, live production switchers, live streaming machines and other similar control devices are gradually designed toward the trend of simplification in the hardware structure. As a consequence, the control devices are friendly to more entry-level live broadcasters or users. However, most users hope that the live production switchers or the live streaming machines can implement more functions or options. Therefore, it is an important issue to expand or extend more functions or operation options based on the simplified hardware structure of the control device.

For example, in the existing live production switchers or live streaming machines, only a single function can be performed after a key is triggered, or two different functions can be selectively performed according to the time length of triggering the key (e.g., long press or short press).

In other words, the design of the conventional control device needs to be further improved.

SUMMARY OF THE INVENTION

In order to overcome the drawbacks of the conventional technologies, the present invention provides a control system. The control system comprises a control device and a display device. Due to the cooperation of the control device and the display device, the function options of the keys on the control device can be expanded.

In accordance with an aspect of the present invention, a control system is provided. The control system includes a control device and a display device. The control device includes plural keys in a specified arrangement. The plural keys are marked with plural first-layer options. Each of the plural first-layer options extends plural second-layer options. The display device is in communication with the control device. A display image of the display device includes plural display blocks. An arrangement of the plural display blocks is identical to the arrangement of the plural keys. When one of the plural keys is triggered by a user, the plural second-layer options extended from the first-layer option corresponding to the triggered key are shown on the display image, and the plural second-layer options are included in the corresponding display blocks, respectively. A specified option of the plural second-layer options is selected by the user when the key on the control device and at a position corresponding to the specified option is triggered.

In an embodiment, at least one of the plural keys includes a backlight structure. When one of the plural keys is triggered by the user and the second-layer options extended from the first-layer option corresponding to the triggered key are shown on the display image, the triggered key emits a backlight, and the keys that are not triggered do not emit the backlight.

In an embodiment, after the key on the control device and at the position corresponding to the specified option is triggered by the user and the specified option of the plural second-layer options is selected, the display block corresponding to the selected option generates a special effect different from special effects of the other display blocks.

In an embodiment, the special effect includes a background color showing effect, a background texture showing effect, an outer frame showing effect, an outer frame color changing effect, a font changing effect or a text color changing effect.

In an embodiment, the selected first-layer option is disabled after the key on the control device and marked with the selected first-layer option is long pressed.

In an embodiment, a surface of at least one of the plural keys is provided with a texture structure.

In an embodiment, the texture structure is a concave structure, a convex surface, a corrugated structure or a Braille.

In an embodiment, at least one of the plural keys has a vibration feedback function. When the key is triggered by the user, the vibration feedback function is enabled.

In an embodiment, each of the plural keys is selected from one of a mechanical key, an optical key, a touch key, a pressure sensitive key and a capacitive key.

In an embodiment, the first-layer options include at least one of a text option, a graphic option, a sound option and a control option.

In an embodiment, the second-layer options include at least one of a next page option and a previous page option.

In an embodiment, the display image further includes a live streaming block. After one option of the plural second-layer options is selected by the user, an information about the selected option is shown on the live streaming block.

In an embodiment, the control device is a live production switcher or a live streaming machine.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. In the following embodiments and drawings, the elements irrelevant to the concepts of the present invention are omitted and not shown.

Figure 1:
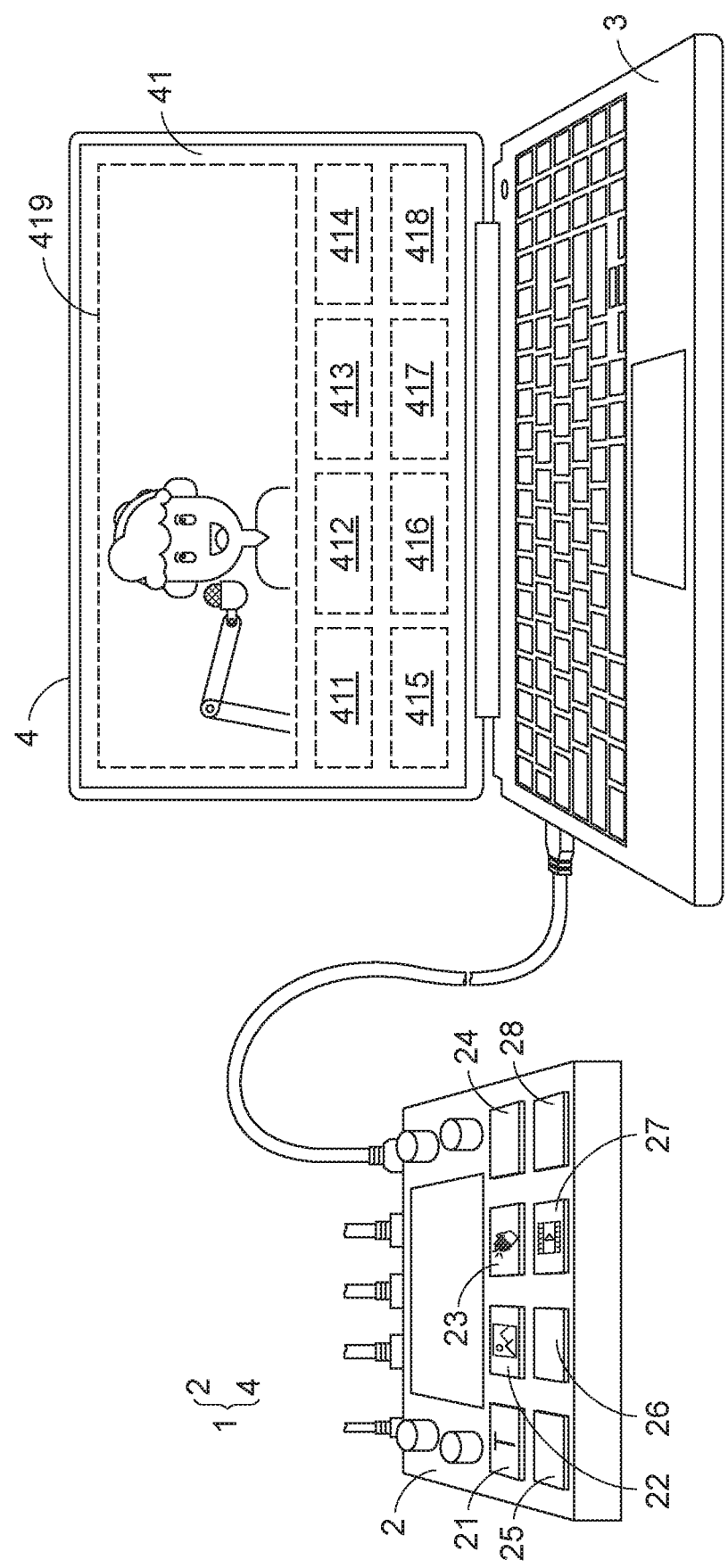
FIG. 1 schematically illustrates the architecture of a control system according to an embodiment of the present invention.

FIG. 1 schematically illustrates the architecture of a control system according to an embodiment of the present invention. As shown in FIG. 1, the control system 1 comprises a control device 2 and a display device. The cooperation of the control device 2 and the display device can expand the function options of the keys on the control device 2. An example of the control device 2 includes but is not limited to a live production switcher or a live streaming machine. In an embodiment, the display device is a stand-alone external screen or a screen of the control device 2. Alternatively, the control device 2 is connected with an external electronic device, and a display screen of the electronic device is used as the display device. In the embodiment of FIG. 1, the control device 2 is connected with a notebook computer 3, and a display screen 4 of the notebook computer 3 is used as the display device. It is noted that the examples of the display device is not restricted.

The control device 2 is in communication with the external screen or the external electronic device in a wired transmission manner or a wireless transmission manner. The control device 2 further comprises a connecting interface (not shown). Consequently, signals can be transmitted from the connecting interface to the external screen or the external electronic device through a connecting cable or a signal transmission unit.

In an embodiment, the control device 2 comprises plural keys 21-28. Each of the plural keys 21-28 may be selected from one of a mechanical key, an optical key, a touch key, a pressure sensitive key and a capacitive key.

The plural keys 21-28 on the control device 2 are arranged in a specified arrangement. For example, these keys are disposed on the control device 2 in an array arrangement. As shown in FIG. 1, the eight keys 21-28 are disposed on the control device 2 in a 2×4 array arrangement. The control device 2 is in communication with the display screen 4. A display image 41 comprises plural display blocks 411-418. The arrangement of the plural display blocks 411-418 is identical to the arrangement of the plural keys 21-28. For example, as shown in FIG. 1, the plural display blocks 411-418 are included in the display image 41 of the display screen 4 in a 2×4 array arrangement. Moreover, the display image 41 further comprises a live streaming block 419. The frame outputted from or controlled by the control device 2 is shown on the live streaming block 419. Moreover, the frame includes images, graphics, text or special effects.

In an embodiment, the symbols corresponding to plural first-layer options 5 are marked on the plural keys 21-28. These first-layer options 5 represent the functions or special effects of the corresponding keys. For example, the first-layer options 5 include a text option 51, a graphic option 52, a sound option 53 and a control option 54.

Moreover, plural second-layer options 6 are extended from each first-layer option 5. The second-layer options 6 can be previously edited or set. In addition, the second-layer options 6 can be stored in the control device or the external electronic device. When one of the plural keys 21-28 is triggered, the plural second-layer options 6 extended from the first-layer option 5 corresponding to the triggered key are shown on the display image 41 of the display screen 4. In addition, the plural second-layer options 6 are included in the plural display blocks 411-418.

Hereinafter, a method of expanding the function options will be described by taking the text option 51 as an example of the first-layer options 5. It is noted that the method of expanding the function options is not restricted. Please refer to FIG. 1 again. In the plural keys, the key 21 in the first row and the first column is marked with a text option, and the text option is exemplified by a letter T. From the letter T marked on the key 21, the user can realize that the key 21 represents a text option. That is, this first-layer option 5 is related to texts. Consequently, the first-layer options 5 (i.e., the first-layer text option) can extend plural second-layer options 6 (i.e., the second-layer text options). For example, the plural second-layer options 6 are related to some phrases that are usually used by the user when using the live production switcher or the live streaming machine. For example, the plural second-layer options 6 include a "Hello" option 601, a "Good Job!" option 602, a "Bye Bye" option 603, a "HB2U" option 605, an "OIC" option 606 and a "LOL" option 607.

Figure 2:
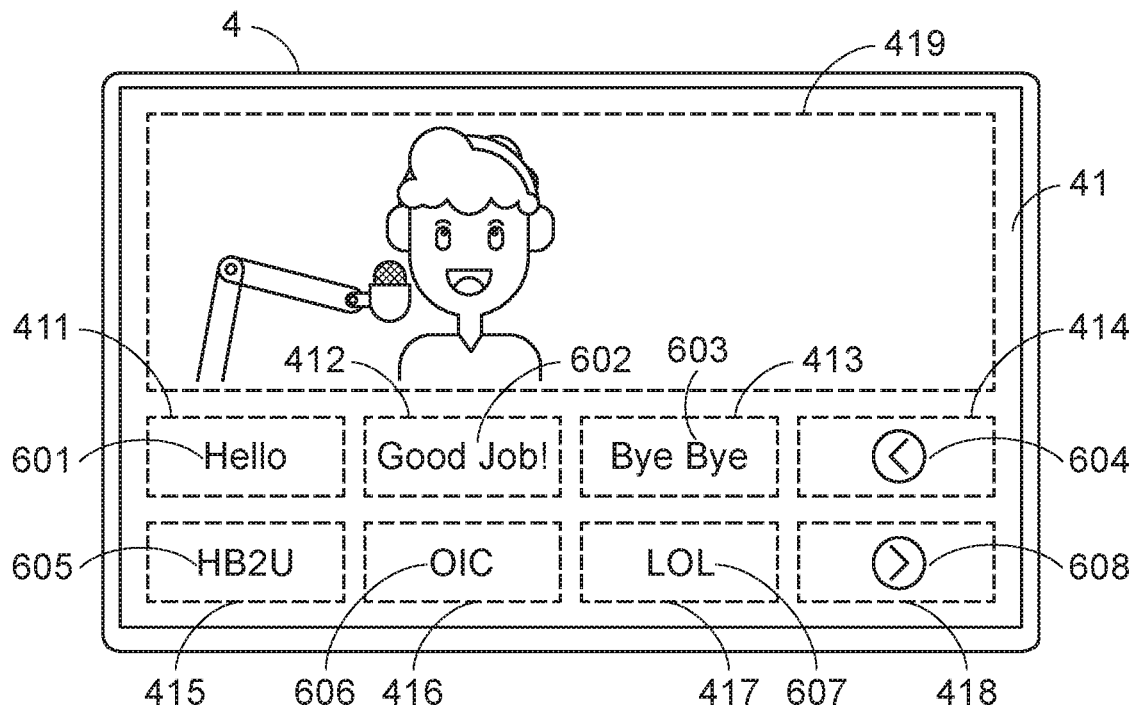
FIG. 2 schematically illustrates a scenario of operating the control system of FIG. 1 to select one of the first-layer options, in which only the top view of the control device and the front view of the display device are shown.
Figure 2:
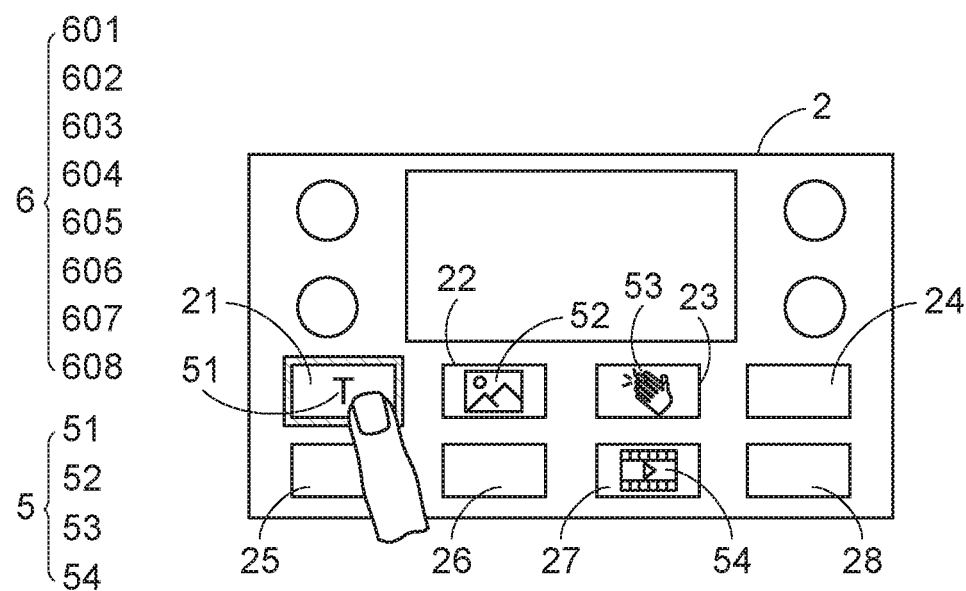

FIG. 2 schematically illustrates a scenario of operating the control system of FIG. 1 to select one of the first-layer options, in which only the top view of the control device and the front view of the display device are shown.

Please refer to FIG. 2. When the key 21 marked with the letter T is triggered by the user, the plural second-layer options 6 extended from the first-layer option 5 corresponding to the triggered key 21 (i.e., the "Hello" option 601, the "Good Job!" option 602, the "Bye Bye" option 603, the "HB2U" option 605, the "OIC" option 606 and the "LOL" option 607) are shown on the display image 41 of the display screen 4. In addition, the "Hello" option 601, the "Good Job!" option 602, the "Bye Bye" option 603, the "HB2U" option 605, the "OIC" option 606 and the "LOL" option 607 (i.e., the second-layer options) are respectively included in the display blocks 411, 412, 413, 415, 416 and 417 of the display image 41. That is, the "Hello" option 601 is included in the display block 411, the "Good Job!" option 602 is included in the display block 412, the "Bye Bye" option 603 is included in the display block 413, the "HB2U" option 605 is included in the display block 415, the "OIC" option 606 is included in the display block 416, and the "LOL" option 607 is included in the display block 417.

Moreover, when the user intends to select one of the options 601, 602, 603, 605, 606 and 607 of the second-layer options 6, the user may trigger one of the keys 21, 22, 23, 25, 26 and 27 on the control device 2 and at the position corresponding to the to-be-selected option. As mentioned above, the arrangement of the keys 21, 22, 23, 25, 26 and 27 on the control device 2 is identical to the arrangement of the display blocks 411, 412, 413, 415, 416 and 417 in the display image 41. Moreover, the keys 21, 22, 23, 25, 26 and 27 are directly related to the display blocks 411, 412, 413, 415, 416 and 417, respectively. Consequently, the user can intuitively select the option in the display block by triggering the key on the control device 2 and at the position corresponding to the display block. For example, the "Good Job!" option 602 is included in the display block 412, and the "Good Job!" option 602 is directly related to the key 22. Consequently, when the user intends to select the "Good Job!" option 602, the user may trigger the key 22 on the control device 2 and at the position corresponding to the to-be-selected "Good Job!" option 602. In this way, the "Good Job!" option 602 can be selected successfully.

Figure 3:
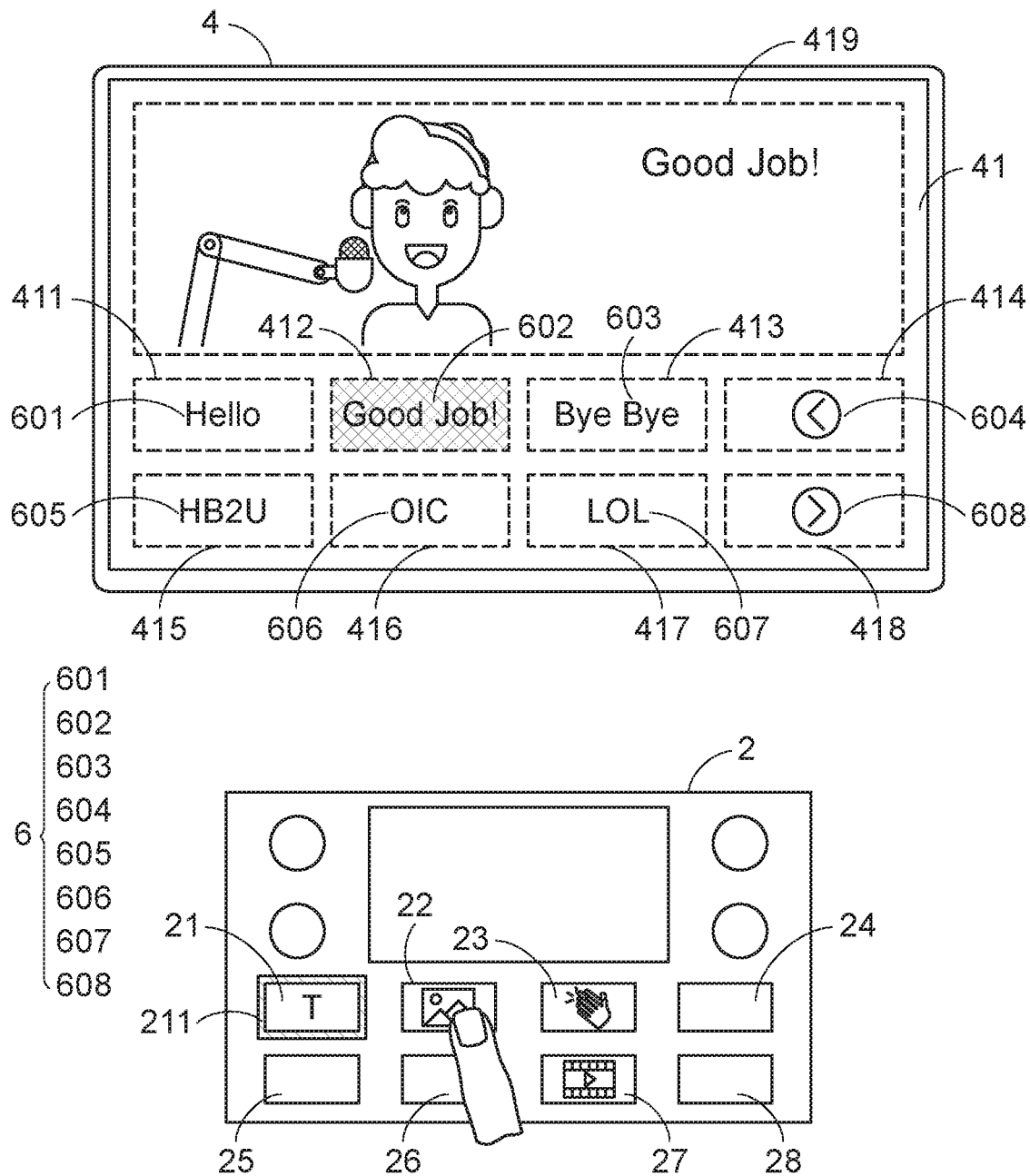
FIG. 3 schematically illustrates a scenario of operating the control system of FIG. 1 to select one of the second-layer options, in which only the top view of the control device and the front view of the display device are shown.

FIG. 3 schematically illustrates a scenario of operating the control system of FIG. 1 to select one of the second-layer options, in which only the top view of the control device and the front view of the display device are shown.

Please refer to FIG. 3. After one of the options 601, 602, 603, 605, 606 and 607 of the second-layer options 6 is selected, the information about the selected option is shown on the live streaming block 419 of the display image 41 in an on-screen display (OSD) manner. For example, after the user triggers the key 22 to select the "Good Job!" option 602, the phrase "Good Job!" is shown on the live streaming block 419 (see FIG. 3).

From the above descriptions, the present invention provides the control system 1. In the control system 1, the keys on the control device 2 and the display blocks in the display image 41 of the display screen 4 have the same arrangement and have the mapping relationship. After referring to the option shown on each display block, the user can intuitively select the desired option by triggering the key at the corresponding position on the control device. Consequently, the function options of the original keys on the control device 2 can be expanded. Moreover, the user only needs to use the same set of keys to select various options without the need of using an additional input device (e.g., a mouse device or a trackball) to assist in the operation.

When the user intends to select another first-layer option 5, the user needs to disable the first-layer option 5 that has been previously selected. For example, after the key on the control device 2 and marked with the previously selected first-layer option 5 is long pressed, the previously selected first-layer option 5 is disabled. For example, after the key 21 marked with the letter T is long pressed by the user, the selected first-layer option 5 (i.e., the text option 51) is disabled. Then, the user can select another first-layer option 5 (e.g., the graphic option 52, the sound option 53 or the control option 54).

Moreover, after one of the options 601, 602, 603, 605, 606 and 607 of the second-layer options 6 is selected, the display block 411, 412, 413, 415, 416 or 417 corresponding to the selected option generates a special effect different from the special effects of the other display blocks. For example, the special effect includes a background color showing effect, a background texture showing effect, an outer frame showing effect, an outer frame color changing effect, a font changing effect or a text color changing effect. As shown in FIG. 3, after the user triggers the key 22 to select the "Good Job!" option 602, the display block 412 for showing the "Good Job!" option 602 generates a background texture different from the background textures of the other display blocks. According to the distinguished special effect, the user can realize that the content associated with the "Good Job!" option 602 has been selected and outputted to the live streaming block 419 through the control device 2.

In addition to above options extended from the first-layer option 5, the second-layer options 6 further include a next page option 608, a previous page option 604 or any other appropriate option.

Figure 4:
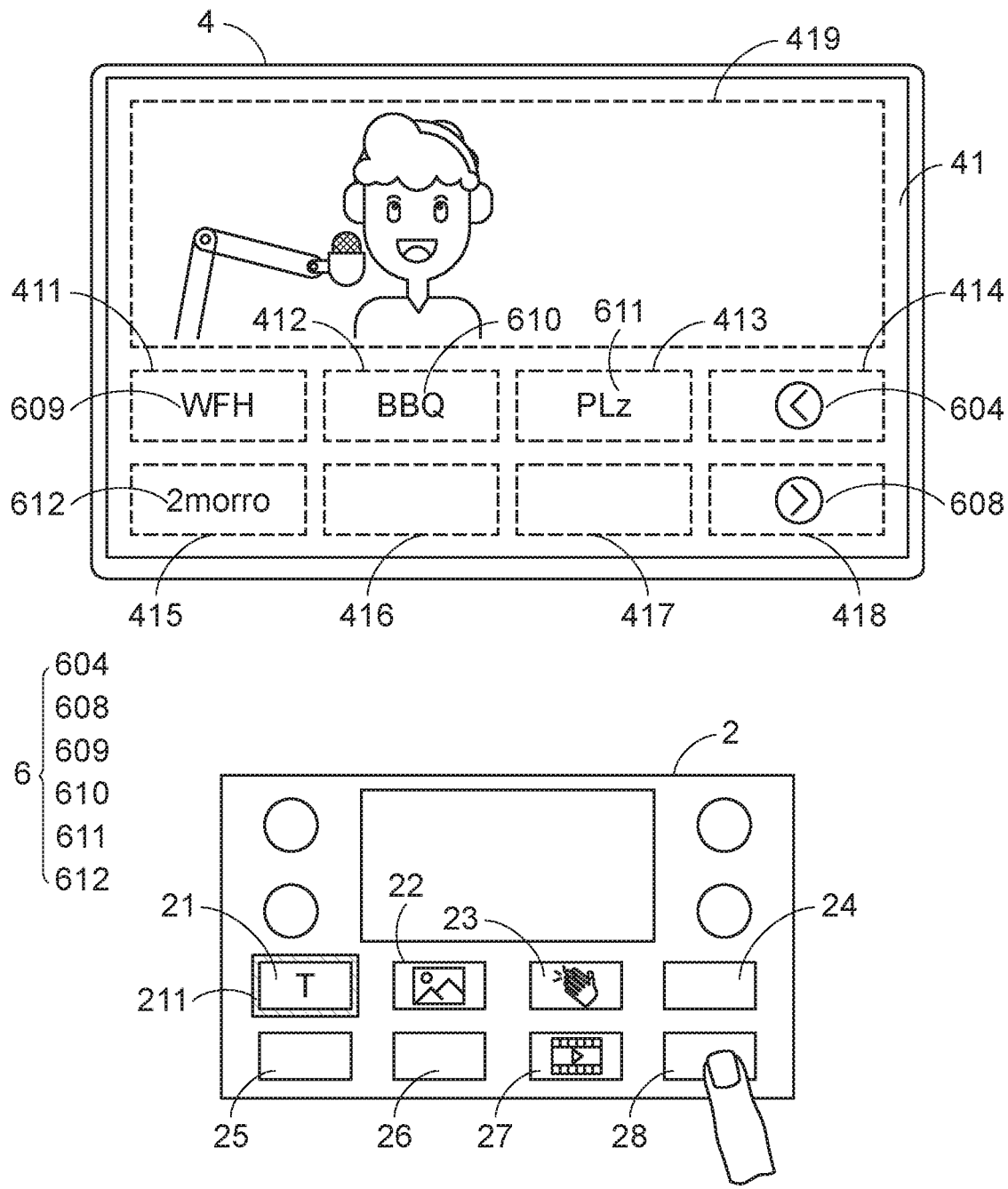
FIG. 4 schematically illustrates a scenario of operating the control system of FIG. 1 to select a next page option, in which only the top view of the control device and the front view of the display device are shown.

FIG. 4 schematically illustrates a scenario of operating the control system of FIG. 1 to select the next page option, in which only the top view of the control device and the front view of the display device are shown.

Please refer to FIGS. 2, 3 and 4. The next page option 608 is included in the display block 418 of the display image 41. In case that the number of the second-layer options 6 extended from the first-layer option 5 is very large, the second-layer options 6 cannot be completely shown on the display blocks of the display image 41. Under this circumstance, the second-layer options 6 are divided into plural groups, and the plural groups of second-layer options 6 are shown on different pages. As shown in FIG. 4, the position of the key 28 on the control device 2 is related to the position of the next page option 608. Consequently, the user may select the next page option 608 in the display image 41 by triggering the key 28 on the control device 2. After the key 28 is triggered, the second-layer options corresponding to the second page (i.e., the second-layer text options) will be shown of the display image 41. For example, the second-layer text options include a "WFH" option 609, an "BBQ" option 610, a "PLz" option 611 and a "2morro" option 612. The "WFH" option 609, the "BBQ" option 610, the "PLz" option 611 and the "2morro" option 612 are respectively included in the display blocks 411, 412, 413 and 415 of the display image 41. That is, the "WFH" option 609 is included in the display block 411, the "BBQ" option 610 is included in the display block 412, the "PLz" option 611 is included in the display block 413, and the "2morro" option 612 is included in the display block 415. Similarly, the second-page second-layer option 609, 610, 611 or 612 may be selected by triggering the key 21, 22, 23 or 25 on the control device 2 and at the position corresponding to the display block.

Similarly, the user may select the previous page option 604 by triggering the key 24 on the control device 2. After the previous page option 604 is selected, the function of switching to the previous page is implemented. Consequently, the display image 41 showing the second-page second-layer options 609, 610, 611 and 612 is switched to the display image 41 showing the first-page second-layer options 601, 602, 603, 605, 606 and 607.

In an embodiment, each of the keys 21, 22, 23, 25, 26 and 27 is equipped with a backlight structure. For example, a light-emitting element is installed with each of the keys 21, 22, 23, 25, 26 and 27. When one of the keys 21, 22, 23, 25, 26 and 27 is triggered by the user, the plural second-layer options extended from the first-layer option corresponding to the triggered key are shown on the display image 41. At the same time, the triggered key emits the backlight, and the other keys that are not triggered do not emit the backlight. For example, as shown in FIG. 3, when the key 21 marked with the letter T is triggered by the user, the plural second-layer options 6 extended from the first-layer option 5 corresponding to the triggered key 21, i.e., the "Hello" option 601, the "Good Job!" option 602, the "Bye Bye" option 603, the "HB2U" option 605, the "OIC" option 606 and the "LOL" option 607, are shown on the display image 41 of the display screen 4. Please refer to FIGS. 2 and 3. At the same time, a backlight circle is shown on the peripheral region 211 of the triggered key 21. Consequently, the user can realize that the contents of the first-layer option 5 or the second-layer options 6 associated with the key 21 have been outputted from the control device 2.

Moreover, after the key on the control device 2 and marked with the previously selected first-layer option 5 is long pressed, the selected first-layer option 5 and the second-layer options 6 extended from the first-layer option 5 are disabled. After the selected first-layer option 5 is disabled, the backlight from the key with the symbol of the first-layer option 5 is turned off.

In an embodiment, the whole region of each of the keys 21, 22, 23, 25, 26 and 27 can emit backlight. In another embodiment, only a partial region of the each of the keys 21, 22, 23, 25, 26 and 27 can emit backlight. It is noted that the region of the key to emit backlight is not restricted. For example, as shown in FIGS. 2 and 3, after the one of the keys 21, 22, 23, 25, 26 and 27 is triggered by the user, the backlight circle is only shown on the peripheral region 211 of the triggered key.

In an embodiment, the surface of at least one of the keys 21~28 is provided with a texture structure, e.g., a concave structure, a convex surface, a corrugated structure or a Braille. The texture structure can facilitate the user to know which of the keys 21~28 is placed or touched by the user's finger. Under this circumstance, the user can intuitively trigger the keys 21~28 without directly viewing the keys 21~28.

In an embodiment, each of the keys 21~28 on the control device 2 is equipped with the function and the structure of providing vibration feedback. For example, plural vibrators are respectively installed within keys 21~28 or installed within the control device 2. When one of the keys 21~28 is triggered, the vibration feedback function is enabled to assist the user in knowing that the triggering action is successfully completed.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A control system, comprising:
   a control device comprising plural keys in a specified arrangement, wherein the plural keys are marked with plural first-layer options, and each of the plural first-layer options extends plural second-layer options; and
   a display device in communication with the control device, wherein a display image of the display device includes plural display blocks, and an arrangement of the plural display blocks is identical to the arrangement of the plural keys,
   wherein when one of the plural keys is triggered by a user, the plural second-layer options extended from the first-layer option corresponding to the triggered key are shown on the display image, and the plural second-layer options are included in the corresponding display blocks, respectively,
   wherein a specified option of the plural second-layer options is selected by the user when the key on the control device and at a position corresponding to the specified option is triggered.

2. The control system according to claim 1, wherein at least one of the plural keys comprises a backlight structure, wherein when one of the plural keys is triggered by the user and the second-layer options extended from the first-layer option corresponding to the triggered key are shown on the display image, the triggered key emits a backlight, and the keys that are not triggered do not emit the backlight.

3. The control system according to claim 1, wherein after the key on the control device and at the position corresponding to the specified option is triggered by the user and the specified option of the plural second-layer options is selected, the display block corresponding to the selected option generates a special effect different from special effects of the other display blocks.

4. The control system according to claim 3, wherein the special effect includes a background color showing effect, a background texture showing effect, an outer frame showing effect, an outer frame color changing effect, a font changing effect or a text color changing effect.

5. The control system according to claim 1, wherein the selected first-layer option is disabled after the key on the control device and marked with the selected first-layer option is long pressed.

6. The control system according to claim 1, wherein a surface of at least one of the plural keys is provided with a texture structure.

7. The control system according to claim 6, wherein the texture structure is a concave structure, a convex surface, a corrugated structure or a Braille.

8. The control system according to claim 1, wherein at least one of the plural keys has a vibration feedback function, wherein when the key is triggered by the user, the vibration feedback function is enabled.

9. The control system according to claim 1, wherein each of the plural keys is selected from one of a mechanical key, an optical key, a touch key, a pressure sensitive key and a capacitive key.

10. The control system according to claim 1, wherein the first-layer options include at least one of a text option, a graphic option, a sound option and a control option.

11. The control system according to claim 1, wherein the second-layer options include at least one of a next page option and a previous page option.

12. The control system according to claim 1, wherein the display image further comprises a live streaming block, wherein after one option of the plural second-layer options is selected by the user, an information about the selected option is shown on the live streaming block.

13. The control system according to claim 1, wherein the control device is a live production switcher or a live streaming machine.

* * * * *